United States Patent [19]

Gawin et al.

[11] 4,042,299
[45] Aug. 16, 1977

[54] PHOTOGRAPHIC RECORDING MACHINE WITH IMAGE DESIGNATOR MARK OPTICAL SYSTEM AND ADJUSTING MEANS THEREFOR

[75] Inventors: Adolph J. Gawin, Skokie; Robert F. Porazinski, Norridge, both of Ill.

[73] Assignee: Bell & Howell Company, Chicago, Ill.

[21] Appl. No.: 572,575

[22] Filed: Apr. 28, 1975

[51] Int. Cl.² .............................................. G03B 27/52
[52] U.S. Cl. .................................. 355/40; 346/107 R; 355/109
[58] Field of Search ................... 355/1, 29, 40, 43, 71, 355/67, 109; 354/105; 346/107 R

[56] References Cited

U.S. PATENT DOCUMENTS

| | | | |
|---|---|---|---|
| 2,827,826 | 3/1958 | Dale et al. | 355/41 |
| 2,952,504 | 9/1960 | Path | 346/107 |
| 3,212,399 | 10/1965 | Walter | 355/24 |
| 3,645,619 | 2/1972 | Burton et al. | 355/40 |

Primary Examiner—L. T. Hix
Assistant Examiner—J. A. LaBarre
Attorney, Agent, or Firm—Robert A. Walsh

[57] ABSTRACT

A photographic recording machine for sequentially exposing images onto a photosensitive web, including an optical system for forming an image designator mark on the photosensitive web in a predetermined position in relation to each image. The optical system includes a light source and a light transmitting pipe having an unfocused lens portion on the end thereof closest the web, and is pivotally mounted for movement adjacent to and removed from the web. Movement of the optical system is controlled by operating the access means of the recording machine when the web is inserted or removed from the machine.

9 Claims, 3 Drawing Figures

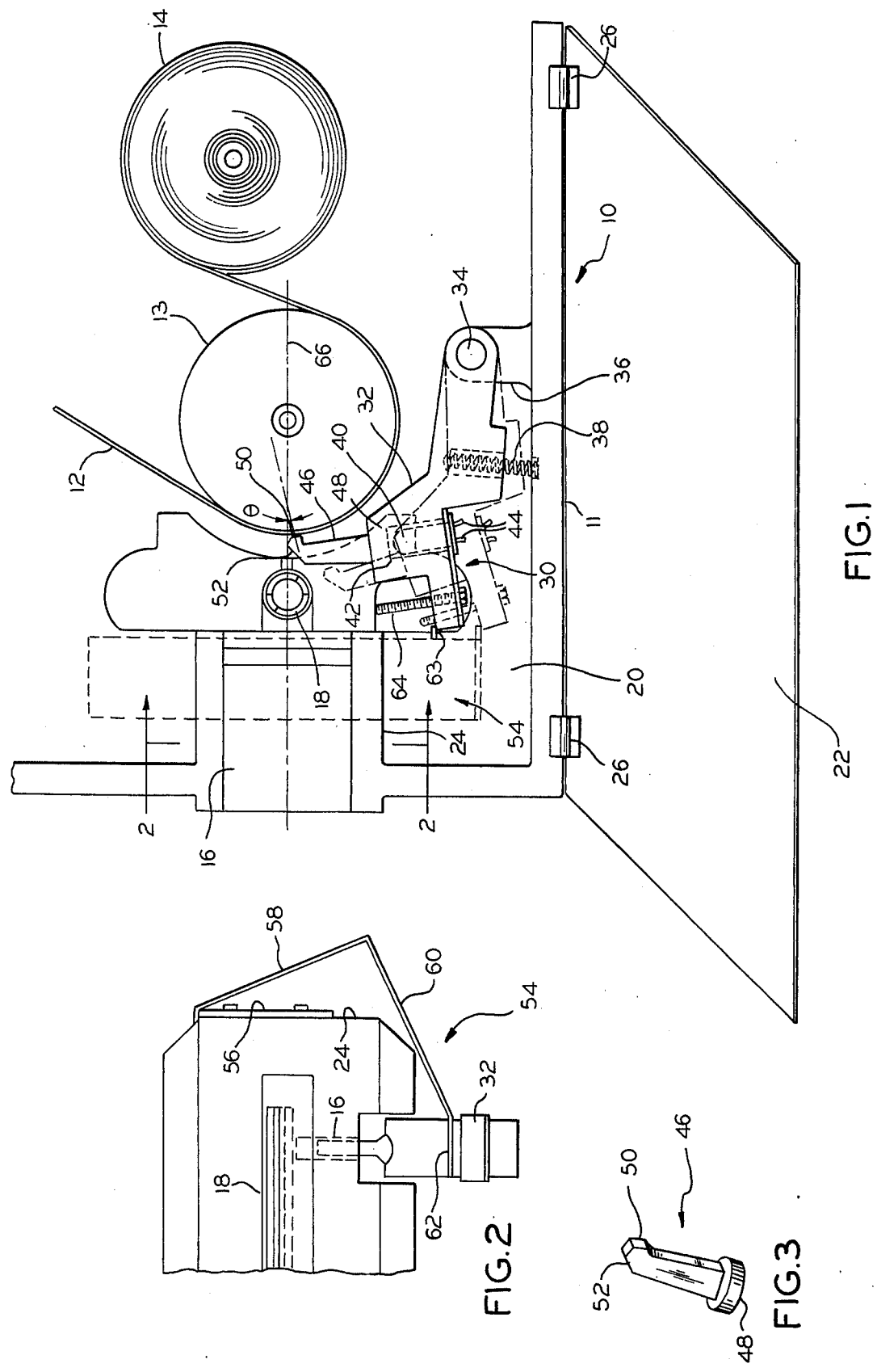

PHOTOGRAPHIC RECORDING MACHINE WITH IMAGE DESIGNATOR MARK OPTICAL SYSTEM AND ADJUSTING MEANS THEREFOR

The present invention relates to photographic recording machines, and in particular to an optical system in such a machine for forming an image designator mark on a moving web of photosensitive material.

One successful system for obtaining rapid retrieval of documents or images formed on a web of photosensitive microfilm comprises the formation of image designator marks on the microfilm adjacent the image. The designator marks are then detected and counted by suitable optical scanning means, whereby a particular document may be retrieved. The designator mark is generally rectangular in shape, and is located on the film at a given distance from the leading edge of its associated document image.

The document image designator mark must be a sharp, clear image, and must also be dark and distinct to actuate the image reader and counter sensor device in the retrieval mechanism. The means for applying the designator marks must also be capable of insuring that additional segments of the web are not exposed to the light forming the mark. The document images on the web are small and close together, and it is important to prevent the emission of stray light from the designator mark optical system, since such stray light would expose and blur the document image.

Several prior systems have been developed for applying a designator mark on a web of film. These include the use of a light transmitting material positioned next to a film for placing a mark on the film, wherein a bright light source is used and only a small portion of this light is directed to the film. Such systems are disclosed, for example, in U.S. Pat. Nos. 2,952,504; 3,212,399; and 3,810,218. The inefficiencies of these systems are obvious. Additional, more complex systems using lenses and mirrors are disclosed in U.S. Pat. Nos. 2,331,133; 2,458,882; and 2,552,266. The need to keep these systems in accurate alignment and the need for a bright light source render these devices impractical for use in standard microfilm cameras.

U.S. Pat. No. 3,645,619 discloses a solid state lamp rigidly mounted essentially, but not actually, in contact with a web of photosensitive film for applying a document designating mark to the film. This system has two disadvantages. First, the lamp and its controls must be small enough to be contained in the arm adjacent the film. This requires a small lamp, wherein the proper amount of light to produce a sharp mark may not be transmitted to the film. Second, the lamp is so close to the film that manual threading of the film in the camera becomes a serious problem.

Still another device for applying a document designating mark to a web of film is disclosed in U.S. Pat. No. 3,757,653. This patent discloses a prism rigidly mounted to the frame of a photographic camera, with a molded lens on one end of the prism for focusing the light onto the film. The prism must be carefully fabricated to produce the proper focusing of the light, and the prism must be rigidly held in place relative to the film to insure proper focusing. It is readily apparent that the cost of producing such a precision prism is high, and that the rigid mounting of the prism may interfere with film threading procedures.

Therefore, an object of the present invention is to provide a relatively inexpensive and accurate optical system for applying an image designator mark on a web of photosensitive material.

An additional object of the present invention is to provide an optical system for applying an image designator mark on a web of photosensitive material, which optical system produces a sharp, clear image with an unfocused optical device.

Still another object of the present invention is to provide an optical system in a photographic device for applying an image designation mark to a web of film, wherein the optical system is capable of movement from a position adjacent the film to a position removed from the film to facilitate ease of threading the film in the device.

Yet another object of the present invention is to provide a moveable optical system in a photographic camera for applying an image designation mark to a photosensitive film, wherein the movement of the optical system is controlled by the access means for inserting and withdrawing film in the camera.

These and other objects of the present invention are accomplished in a preferred embodiment by using a light-emitting diode inherent high speed operation to expose and code-mark a web of photosensitive film. The light source is mounted in a camera on a plate for limited rotative movement about a mounting point. A light transmitting pipe, or fiber optic element, is mounted adjacent the light source for movement therewith, and receives the light from the diode. Due to the pivotal mounting means, the light pipe and source can assume two positions in the camera. In the first position, when a mark is being applied to the film, such as when the camera is operating, the light pipe is located in close proximity to the film. When the film is being inserted or replaced, the light pipe is in its second position, removed from the film. The positioning of the pipe is automatically controlled by opening and closing a cover plate or access means of the camera. When the cover plate is opened to allow insertion and threading of the film, the light pipe is automatically moved away from the film. The pipe transmits light from the diode, and is contoured to direct the light to the film. However, the lens or exit portion of the light pipe is not contoured to focus the light on the film.

In the detailed description of the preferred embodiment presented herein, reference is made to the accompanying drawings wherein:

FIG. 1 is an elevation view of a portion of a photographic recording machine, showing the details of the novel optical system and actuating means forming part of the present invention;

FIG. 2 is a view of the photographic recording machine of FIG. 1 taken along the line 2—2; and FIG. 3 is a detailed view of the light pipe forming part of the present invention.

Referring to FIG. 1, there is shown a photographic recording machine generally designated by the number 10 and including a housing 11. In the preferred embodiment, the recording machine is a microfilm camera adapted to sequentially expose images, such as a document image, onto a sheet of photosensitive web or film 12. The web 12 is fed from a supply reel 14 by means of a web drive drum 13 past a recording lens 16 and rotary shutter 18, whereby an image projected through the lens 16 is exposed on the web 12 when an open portion of the shutter 18 moves in line with the optical axis 66 of the lens. The web 12 is ultimately fed to a take-up reel in the housing 11, (not shown) where it is stored prior to development of the exposed images. The lens 16 is fixed in a lens support member 24 formed integral with the housing 11 of recording machine 10. Shutter 18 is also supported by member 24.

The drive drum 13, supply reel 14, lens 16 and shutter 18 are contained in a chamber 20 of recording machine 10, covered by pivotal access means, such as door 22. By opening door 22, supply reel 14 of web 12 can be inserted in the recording machine 10. Also, door 22 allows access for removing the web 12 from the takeup reel following exposure of a desired number of images. Door 22 is mounted to housing 11 by means of hinges 26.

A primary object of the present invention is to provide an optical system for forming the image designator mark on web 12 in a predetermined position in relation to each image projected onto the web 12 through lens 16. For this purpose, the present invention includes an optical system generally designated by the numeral 30 for projecting the designator mark image onto the web 12. Optical system 30 includes a mounting member 32 pivotally attached to housing 11 by means of pivot pin 34 and bracket 36. A spring or other bias means 38 extends between housing 11 and mounting member 32 to bias the mounting member in a clockwise direction, as seen in FIG. 1. Of Course, it is merely a designer's choice as to whether spring 38 biases the member 32 in either a clockwise or counterclockwise direction, and, therefore, the described structure and operations could be reversed from the disclosed structure.

A light source, comprising, for example, light emitting diode 40 is mounted in a chamber 42 extending through mounting member 32. A pair of connector prongs 44 extend from diode 40 and are adapted to be connected to a suitable power source for energizing diode 40 upon actuation of a signal that a designator mark is to be applied to web 12. A time delay circuit is connected between a document sensor device (not shown) in the recording machine, which circuit controls the actuation of diode 40 after a suitable length of time following detection by the sensor of a document to be photographed.

The optical system 30 also includes a light pipe or prism 46 mounted at the upper end of chamber 42, and extending upward therefrom. The light pipe or prism of the disclosed embodiment is composed of a clear light transmittable acrylic plastic material, and includes a base portion 48 which is transparent at the bottom, and an unfocused lens portion 50 formed at the opposite end of the pipe. Light pipe or prism 46 forms a path for the transmission of light from diode 40 to lens 50, and base portion 48 is disposed in chamber 42 adjacent diode 40. All external surfaces of light pipe or prism 46 are covered with an opaque coating to eliminate extraneous light, except base portion 48, reflecting surface 52, and lens 50. Lens 50 is mounted on an extending or neck portion 52 of the light pipe (FIG. 3) and extends towards web material 12. All light passing through the pipe from diode 40 is transmitted to lens 50.

In the present embodiment, lens portion 50 of the light pipe is flat and unfocused. Since the focus or spread angle of light eminating from the light pipe 46 is not critical in the present invention, the choice of design for lens 50 is not important. Also, the selection of material used for the light pipe is not critical, since the angles of incidence within the pipe is not critical.

Actuator means for adjusting the position of optical system 30 are controlled by the opening and closing of door 22. To this end, a spring bias element 54 is mounted to lens support member 24, as best seen in FIG. 2. Bias element 54 in the preferred embodiment comprises a flat spring having a section 56 for attachment to lens support member 24, an outwardly extending section 58, and a section 60 extending toward mounting member 32. The end of the bias element 54 adjacent mounting member 32 comprises a flat section 62 for engagement with an upward facing flange 63 of the mounting member 32.

When the bias member 54 is in its natural state, outwardly extending section 58 extends beyond the entry plane of chamber 20 covered by door 22. Thus, when door 22 is closed, section 60 of bias member 54 is moved to the left, as viewed in FIG. 2, thereby moving flat section 62 upward in an arcuate path. This upward motion allows spring 38 to drive mounting member 32 in a clockwise direction about pivot pin 34, as viewed in FIG. 1.

Mounting member 32 also includes an adjusting screw 64 threaded into a portion thereof. The upper end of screw 64 (FIG. 1) abuts the bottom of lens support member 24, and limits the clockwise or upward motion of mounting member 32. The amount of upward movement of member 32 can be adjusted by turning threaded screw 64. Opening door 22 allows bias member 54 to return to its natural state, thereby applying a downward pressure to flange 63, which pressure overcomes the force of spring 38 and drives mounting member 32 in a counter-clockwise or downward direction about pivot pin 34.

The pivotal movement of mounting member 32 positions light pipe 46 toward and away from web 12 adjacent drive drum 13. After a supply reel 14 containing web or film 12 has been inserted in the recording machine, and the film has been threaded past the lens 16, shutter 18, and onto the take-up reel (not shown), door 22 is closed over chamber 20. The door abuts outwardly extending portion 58 of bias member 54, forcing the latter inward. Mounting member 32 then pivots upward, moving the light pipe 46 toward web 12 thereby lens portion 50 of the light pipe is adjacent a specified portion of the film.

In the embodiment of FIG. 1, lens 50 is positioned at a slight angle $\Theta$ from the optical centerline 66 of the imaging system of the recording machine. Threaded screw 64 is adjusted such that lens 50 is 0.0005 to 0.0010 inches from the face of web 12 when door 22 is closed. By maintaining the distance between web 12 and lens 50 within this range, film image scatter or the spread angle of light eminating from light pipe 46 is minimized. With light scatter thus controlled by the spacing between the lens and the web, it is possible to use an unfocused lens 50 on the light pipe, which reduces the cost of producing the light pipe-lens combination. It has been found that with the unfocused light beam situated at a distance from 0.0005 to 0.0010 inches from the web, a clean, clear image designator mark of proper density is applied to the web. With light scattering reduced or eliminated, other portions of the web 12 are not inadvertently exposed. In addition, a proper gap is maintained between lens 50 and web 12 to prevent scratching or cutting the web.

When web 12 has been completely exposed, or when it is otherwise desired to remove the web from the recording machine 10, door 22 is swung open, enabling section 58 of bias member 54 to move to the right (FIG. 2) and force mounting member 32 and optical system 20 downward and away from the surface of web 12. Light pipe 46 then does not interfere with the process of removing, loading and threading the film.

The invention has been described in detail with particular reference to the preferred embodiment thereof, but it will be understood that variations and modifications can be effected within the spirit and scope of the invention.

We claim:

1. In a photographic recording machine;
   means for sequentially exposing images onto a photosensitive web;
   removable access means associated with said machine whereby said web is inserted in or removed from said machine when said access means is in an open position;
   an optical system for forming an image designator mark on said photosensitive web in a predetermined position in relation to each said image;
   said optical system including a light source projecting means moveable from a first position adjacent said web to a second position removed from said web;
   actuator means operatively connected between said access means and said light source projecting means to move said projecting means from said first position to said second position when said access means is open, and to move said projecting means from said second position to said first position when said access means is closed.

2. In a photographic recording machine;
   means for sequentially exposing images onto a photosensitive web;
   removable access means associated with said machine whereby said web is inserted in or removed from said machine when said access means is in an open position;
   an optical system for forming an image designator mark on said photosensitive web in a predetermined position in relation to each said image;
   said optical system including a light source projecting means moveable from a first position adjacent said web to a second position removed from said web;
   said light source projecting means including;
   mounting means pivotally attaching said projecting means to said machine, whereby said projecting means pivots between said first and second positions;
   spring bias means disposed between said machine and said projecting means to bias said projecting means toward said first position;
   actuator means operatively connected between said access means and said light source projecting means to move said projecting means from said first position to said second position when said access means is open, and to move said projecting means from said second position to said first position when said access means is closed;
   said actuator means including lever arm means pivotally attached to said machine at one end and disposed in abutting contact with said projecting means at the other end;
   said lever arm means abutting and being moved by said access means,
   whereby when said access means are in said closed position, said projecting means is in said first position; and when said access means are in said open position, said lever arm means is enabled to move said projection means to said second position.

3. In a photographic recording machine;
   means for sequentially exposing images onto a photosensitive web;
   an optical system for forming a precisely shaped image designator mark on the photosensitive web in a predetermined position in relation to each said image;
   said optical system including a semiconductor light source and a light pipe beginning directly at said semiconducting source and terminating on its end in an unfocused lens disposed directly adjacent and in closely spaced proximity to said web without any intermediate masking means;
   said light pipe defining a specific path for both transmitting light directly from said source to said web, the lens outline there shaping the image formed on said web, whereby said light is unfocused when transmitted from said light pipe and onto said web thus forming a uniformly spread and precisely shaped field of light on the web.

4. The photographic recording machine of claim 3 wherein the distance between said light pipe and said web is in the range of 0.0005 inches to 0.0010 inches.

5. In a photographic recording machine;
   means for sequentially exposing images onto a photosensitive web;
   an optical system for forming an image designator mark on the photosensitive web in a predetermined position in relation to each said image;
   said optical system including a light source and a light pipe disposed adjacent said web;
   said light pipe defining a specific path for transmitting light from said source to said web, whereby said light is unfocused when transmitted from said light pipe to said web; and wherein said light source and light pipe are pivotally mounted to said machine for movement adjacent and away from said web.

6. The photographic recording machine of claim 3 wherein said light pipe is an acrylic prism having an opaque coating covering said pipe except where said light enters and exits said pipe.

7. In a photographic recording machine;
   means for sequentially exposing images onto a photosensitive web;
   an optical system for forming a precisely shaped image designator mark on the photosensitive web in predetermined relation to each said image;
   said optical system including a semiconductor light source and a light pipe beginning directly at said semiconducting source and disposed adjacent said web, said light pipe being an acrylic prism having an opaque coating covering said pipe except where said light enters and exits said pipe; said light pipe defining a specific path for transmitting light from said source to said web; and a rectangular, unfocused lens element formed integral with said light pipe at the point where said light exits said pipe, whereby said light is unfocused when transmitted from said light pipe to said web.

8. In a photographic recording machine;
   means for sequentially exposing images onto a photosensitive web;
   an optical system including a light source and a light transmitting means movably disposed in spaced relation relative to said web for forming an image designator mark on said web in a predetermined position in relation to each said image;

said optical system pivotally mounted to said machine and moveable from a first position adjacent said web to a second position removed from said web.

9. The photographic recording machine of claim 8 wherein said light transmitting means includes a light pipe defining a light path between said light source and said web; and a rectangular, unfocused lens element formed integral with said light pipe at the point where said light exits said pipe.

* * * * *